United States Patent
Thiel et al.

(10) Patent No.: US 7,870,248 B2
(45) Date of Patent: Jan. 11, 2011

(54) EXPLOITING SERVICE HEARTBEATS TO MONITOR FILE SHARE

(75) Inventors: Gregory I. Thiel, Black Diamond, WA (US); Rebecca L. Anderson, Seattle, WA (US); Thomas J. Miller, Bellevue, WA (US); Martin Andras Chisholm, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 11/415,328

(22) Filed: May 1, 2006

(65) Prior Publication Data

US 2007/0255822 A1   Nov. 1, 2007

(51) Int. Cl.
*G06F 15/173* (2006.01)

(52) U.S. Cl. ................................. 709/224; 709/223
(58) Field of Classification Search ............ 709/224, 709/223
See application file for complete search history.

(56) References Cited

U.S. PATENT DOCUMENTS

| | | | |
|---|---|---|---|
| 5,490,270 A | 2/1996 | Devarakonda et al. | |
| 6,178,529 B1 | 1/2001 | Short et al. | |
| 6,393,485 B1 | 5/2002 | Chao et al. | |
| 6,438,705 B1 | 8/2002 | Chao et al. | |
| 6,871,222 B1 | 3/2005 | Frank et al. | |
| 6,950,833 B2 | 9/2005 | Costello et al. | |
| 2002/0010762 A1 | 1/2002 | Kodama | |
| 2002/0188891 A1 | 12/2002 | McBrearty et al. | |
| 2004/0153841 A1 | 8/2004 | Beck | |
| 2005/0021713 A1* | 1/2005 | Dugan et al. | 709/223 |
| 2005/0033777 A1* | 2/2005 | Moraes et al. | 707/202 |
| 2005/0198247 A1* | 9/2005 | Perry et al. | 709/223 |
| 2005/0216502 A1 | 9/2005 | Kaura et al. | |
| 2008/0281950 A1* | 11/2008 | Wald et al. | 709/223 |

OTHER PUBLICATIONS

Mineno, et al., "Multiple Paths Protocol for a Cluster Type Network," Abstract printed from http://www3.ieeexplore.ieee.org/search/srchabstract.jsp?arnumber=1199436&isnumber=27003&punumber=8544&k2docky=1199436@ieeecnfs&query=%28+cluster+file%3Cin%3Eab+%29&pos=), printed on Feb 9, 006, 2 pages, USA.

Segawa et al., Design and Implementation of PVFS-PM: A Cluster File System on Score, Proceedings of the 3rd IEEE/ACM International Symposium on Cluster Computing and the Grid, 2003, IEEE, 7 pages, USA.

* cited by examiner

*Primary Examiner*—J Bret Dennison
*Assistant Examiner*—Mark D Fearer
(74) *Attorney, Agent, or Firm*—Senniger Powers LLP

(57) ABSTRACT

Detecting the failure of file transfers via a network copy service from a source computer to a destination computer via a network monitoring service. If the network monitoring service determines that the source computer is no longer available, the destination computer initiates a second file transfer request via the network copy service from a second source of the file.

14 Claims, 2 Drawing Sheets

EXPLOITING SERVICE HEARTBEATS TO MONITOR FILE SHARE

BACKGROUND

In a network environment, it is critical for highly available applications, such as electronic mail applications, to transfer files among computers within the network quickly and reliably. For this reason, such highly available applications often require failures in transferring files to be detected very quickly. If a computer that is a source of a file being transferred fails during the transfer, the highly available application will usually attempt to access the file from another source computer in the network or begin a recovery procedure if no other source computer is available in the network. Typically, a network file sharing implementation is utilized by the application to transfer files from a source computer to a destination computer.

Known network file sharing implementations use a connection based transport protocol between the client and server. Over such a connection, a file sharing protocol makes requests between the client and server as operations are performed. For example, a client may request that a file be copied from the server to the client via a file share. The file sharing implementation includes timeouts and behaviors to detect when the server is no longer available. Typically, these timeouts are between 30-45 seconds in order to allow the server time to respond when under load and to minimize the network traffic.

When a highly available application is built on top of the file sharing protocol, the application must accept the failure detection time of the file sharing implementation. Additionally, highly available applications often implement multiple file shares to avoid a single point of failure of the application. By implementing redundant file shares, failure detection time is undesirably extended because the application must try each file share before detecting a failure.

For example, suppose the highly available application can copy a file from two different source computers on the network. The application requests the file from the first source computer and, about 30 seconds later, receives a timeout indicating the first source is unavailable. Next, the application will request the file from the second source computer. Unfortunately, the application will have to wait another 30 seconds (60 seconds total) to determine if the second computer is also unavailable. Therefore, the highly available application utilizing the file sharing protocol cannot detect a failure at a desired speed (e.g., within 2-5 seconds).

One possible solution to the problem requires the highly available application to monitor all of the source computers in the network. To achieve a desired 2-5 second timeout, the application would be required to send a message or other communication to all source computers approximately every 0.5 seconds. However, this type of complex monitoring requires a great deal of overhead and must be very efficient to avoid degrading the network and the server executing the highly available application. The network degradation will be amplified if more than one server is executing the highly available application since each instance of the application will need to monitor all source computers.

Another possible solution to the problem requires the highly available application to implement a new file sharing protocol with a shorter timeout. Unfortunately, this would also greatly increase the complexity and overhead involved in executing the highly available application. In this instance, the highly available application would not be extensible because a new file sharing protocol would have to be implemented every time a new file system or network protocol is introduced on a source computer. Additionally, implementing a new protocol would be a waste of resources since most networks implement some form of file sharing.

SUMMARY

Embodiments of the invention overcome one or more deficiencies in known network file sharing systems by utilizing a network monitoring service to determine if one or more network file sources are no longer available. According to aspects of the invention, an application on the destination computer requests a file transfer of a transaction log via a network file service when a new transaction log file becomes available on a source computer. Once the transaction log file has been requested, the destination machine monitors the source machine via the network monitoring service until the file transfer is complete. If the network monitoring service determines that the source computer is no longer available on the network during the transfer, the destination computer requests the transaction log from another available source computer. In another embodiment, the transaction log is copied from the source computer to the destination computer as part of a database replication application which synchronizes information between databases to maintain consistency.

Computer-readable media having computer-executable instructions for file share monitoring embody further aspects of the invention. Alternatively, embodiments of the invention may comprise various other methods and apparatuses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
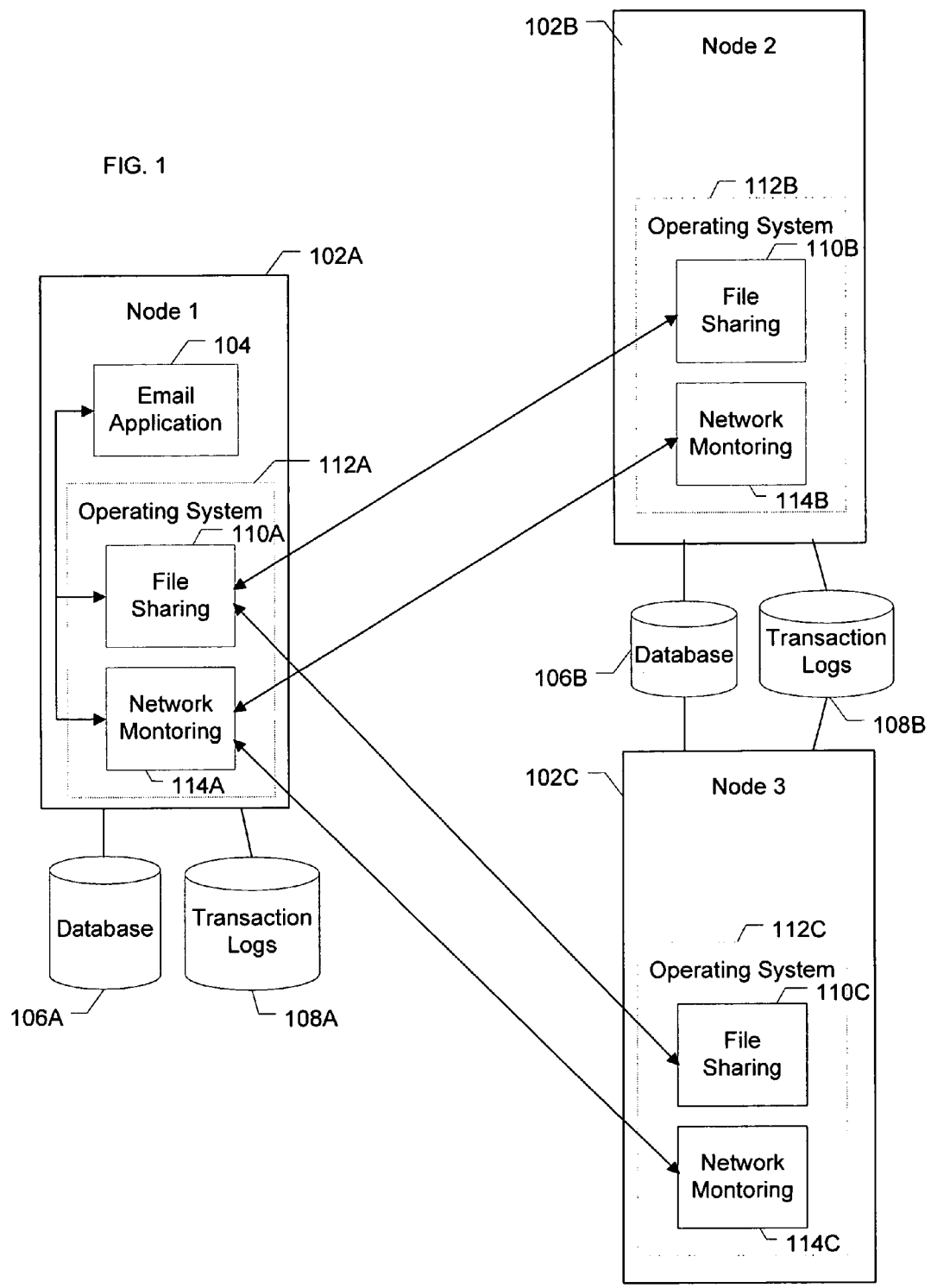
FIG. 1 is a block diagram illustrating one example of a suitable computing system environment in which the invention may be implemented.

Referring to the drawings, FIG. 1 shows an exemplary computer system for rapidly determining the failure of a file transfer between nodes in a networked environment according to aspects of the invention. Advantageously, embodiments of the invention leverage available information, such as a tuned heartbeat mechanism used to monitor nodes in a clustered environment, to rapidly detect the failure of the file transfer without writing a new file sharing protocol.

In the illustrated embodiment, the destination node 102A includes a highly available application 104. The highly available application 104 is, for example, an application that is critical to an enterprise and fault tolerant. A typical highly available application 104 will execute on multiple servers and store data in multiple data stores to provide redundancy in case of the failure of a data store or server. In one embodiment, the highly available application 104 is an email application that utilizes redundant databases 106A, 106B to provide a fault tolerant solution. Each database 106A, 106B in the email application 104 must be synchronized. In one method for synchronizing the databases 106A, 106B, database transactions logs 108A, 108B are transferred from one node 102A, 102B, 102C to another by a file sharing service 110A, 110B, 110C provided by an operating system 112. Transaction logs 108A, 108B contain information relating to changes to the database 106A, 106B (e.g., updates, deletions, and the like).

Although a single logical connection between the file sharing services 110A, 110B, 110C and the network monitoring services 114A, 114B, 114C of the nodes 102A, 102B, 102C is shown in FIG. 1 for convenience, it is to be understood that any number of nodes may be utilized and multiple physical network connections may implemented between nodes to provide the logical connection. For example, in one embodiment, the logical connection is implemented by one or more network paths to a single computer or node. In this embodiment, nodes 102B and 102C represent the same physical machine with multiple network paths. In another embodiment, the logical connection is implemented by one or more network paths to one or more nodes 102A, 102B, 102C.

The file sharing service 110A, 110B, 110C may be any file sharing service 110A, 110B, 110C provided by the operating system 112 of the node 102A, 102B, 102C. The file sharing service 110A, 110B, 110C is a service that maintains and manages files accessible to users or applications on the network. Examples of file sharing services include: Network File System (NFS), Server Message Block (SMB), HyperText Transfer Protocol (HTTP), Netware, Andrew file system (AFS), File Transfer Protocol (FTP) and Cells in Frames (CIF). The file sharing services 110A, 110B, 110C use a connection based transport protocol between nodes 102A, 102B, 102C. Over this connection, the file sharing services 110A, 110B, 110C make requests between the nodes 102A, 102B, 102C as operations are performed. The file sharing services 110A, 110B, 110C include timeouts and behaviors to detect when nodes 102A, 102B, 102C are no longer available on the network. Typically, these timeouts are between 30-45 seconds in order to allow the nodes 102A, 102B, 102C to respond when under load and to minimize the network traffic.

While the file or transaction log 108B is being transferred from a source node 102B to a destination node 102A, the destination node 102A monitors the transfer by monitoring the source node 102B through a networking monitoring service 114A. The network monitoring service 114A is provided by the operating system 112A of the destination node 102A. The network monitoring service 114A, 114B, 114C is a fast and efficient service that monitors the status of a logical group of nodes 102A, 102B, 102C on the network. A tuned heartbeat mechanism used to monitor nodes in a clustered environment is one example of the network monitoring service 114A, 114B, 114C. As a function of the tuned heartbeat mechanism, each node in the cluster sends messages to all other nodes in the cluster on a regular basis to detect the failure of a node. The messages are sent frequently (e.g. approximately every 0.5 seconds) so that the failure of node can be detected rapidly. A typical network monitoring service 114A, 114B, 114C can detect the failure of node 102A, 102B, 102C within approximately 2-5 seconds. By monitoring the nodes 102A, 102B, 102C through the network monitoring service 114A, 114B, 114C, the application 104 can determine within a matter of seconds if a node 102A, 102B, 102C is unavailable instead of waiting for the file sharing protocol timeout of 30-45 seconds.

Figure 2:
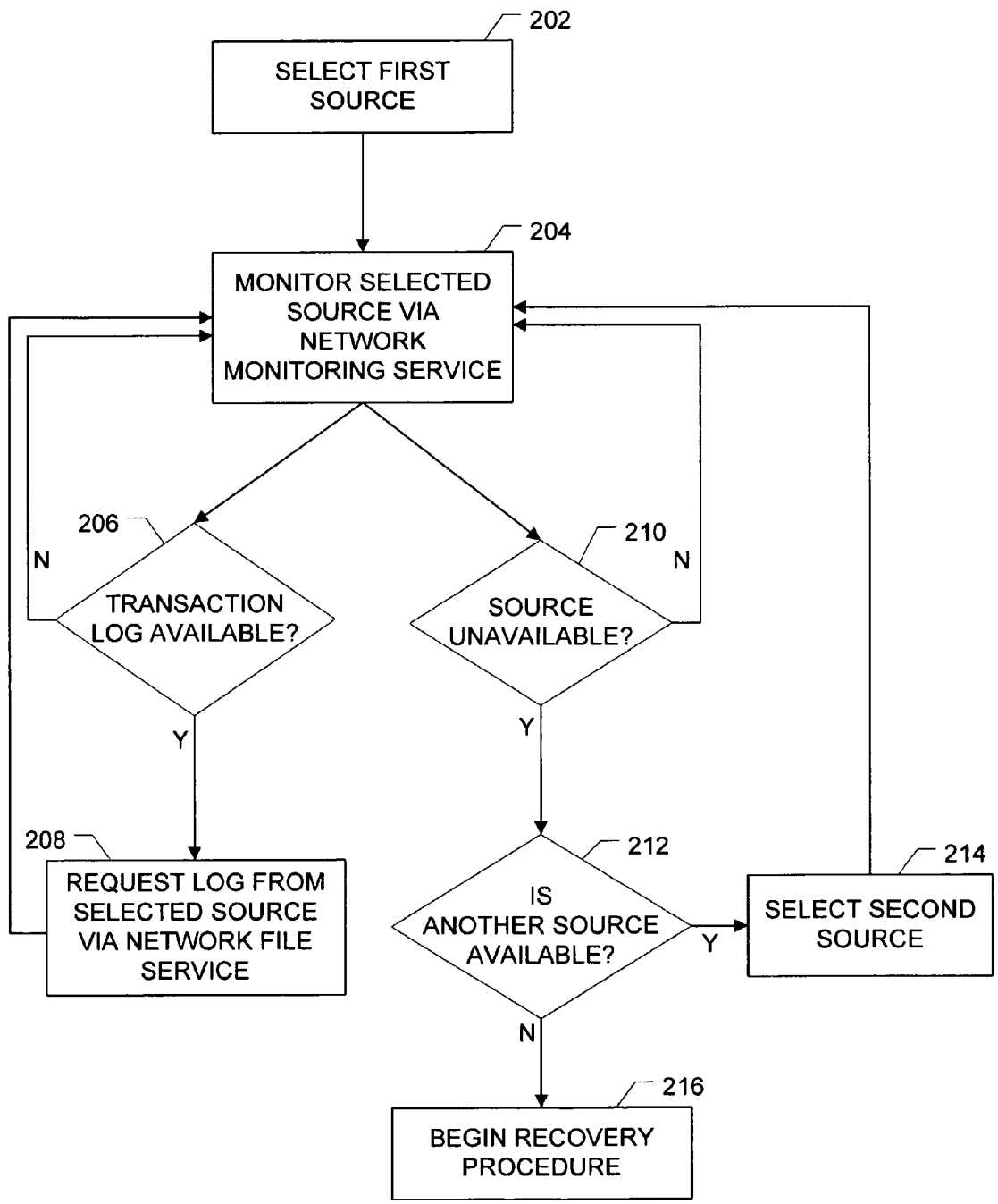
FIG. 2 is an exemplary flow diagram illustrating file transfer failure detection according to an embodiment of the invention.

Referring to FIG. 2, at 202, the application 104 selects one of the sources 102B, 102C. In one embodiment, a clustering service provides a list of the sources. The clustering service enumerates the networks attached to the given node. Then, the service enumerates the network interfaces attached to the network to determine which nodes the network interfaces are attached. The clustering service also provides the state of the network and the state of the network interfaces, so the application 104 can select a network interface (source) for the file transfer that is very likely to be available.

In this embodiment, the list of sources is recomputed whenever the clustering service detects a configuration change (e.g. a network interface being added or removed, a network interface being brought up or down). The list is also recomputed after a specific timeout (e.g. five seconds) in case the clustering service notification was not received. In this embodiment, the application 104 selects the first source in the list.

In another embodiment, the clustering service allows an administrator to classify networks as 'private', 'public', or 'mixed'. The classes of networks may be prioritized and certain classes may not be available for use. These priorities and restrictions are communicated to the application 104 by the clustering service. In this embodiment, the application 104 selects the first source in the list. However, the application 104 will incorporate the priorities and restrictions specified by the clustering service. For example, the administrator may configure the clustering service so that the application 104 uses sources from the private network first, then from the mixed network, and never from the public network.

Referring again to FIG. 2, at 204, the application 104 monitors the source via the network monitoring service 114A. The network monitoring service is provided by the operating system 11 2A and monitors the nodes 102A, 102B, 102C or sources on the network. In one embodiment, the sources are part of a cluster. The servers within a cluster or other group of independent servers or nodes operating and appearing to clients as if they were a single unit are designed to shift work from one server to another. Advantageously, this enhances load balancing and fault tolerance.

A cluster according to embodiments of the invention employs a tuned heartbeat mechanism to monitor the status of nodes with the cluster. This tuned heartbeat mechanism sends messages across the network at regular intervals (e.g., approximately every 0.5 seconds) and can quickly determine if a server in the cluster has failed (e.g., in approximately 2-5 seconds). In at least one embodiment, the network monitoring service 114A utilizes the tuned heartbeat mechanism of the cluster. This allows embodiments of the present invention to leverage the existing cluster infrastructure to rapidly determine when a source has failed without implementing special file sharing protocols or network monitoring utilities.

At 206, the application 104 determines that a new transaction log file 108B is available from one or more sources. In one embodiment, the sources include one or more network paths to a single computer or node 102A, 102B, 102C. In another embodiment, the source may be one or more network paths to one or more computers 102A, 102B, 102C.

At 208, the application 104 requests the transaction log 108B from the selected source via the network file service 110A. The network file service 110A is provided by the operating system 112A and may include one or more of the types of file services described above. In one embodiment, the application 104 communicates with network file service 110A through one or more of the following: an application programming interface or a remote procedure call.

At 210, the network monitoring service 114A determines if the source is unavailable. If the source is available, the application 104 continues to monitor the source at 204. If the network monitoring service 114A determines that the source is unavailable at 210, the application 104 determines if another source is available at 212.

In one embodiment, the application 104 determines via the network monitoring service 114A the status of the other sources in the network before attempting to select another source. The application 104 does not terminate any failed requests via the network file service 110A because the network monitoring service 114A has already determined that the source has failed and any attempts to communicate with that source would be futile and time consuming. Additionally, because the network monitoring service 114A can detect the failure of a source within approximately 2-5 seconds instead of waiting for the network file service 110A timeout of 30-45 seconds, the application 104 can rapidly determine when one source is no longer available and quickly initiate another request for the transaction log 108B if another source is available or begin a recovery procedure if no other source is available.

If another source can provide the transaction log 108B, the application 104 requests the transaction log file 108B from the new source at 208. The process then continues on at 204 as described above with the application 104 monitoring the new source via the network monitoring service 114A. If no other source can provide the transaction log 108B at 214, the application 104 may begin a recovery procedure at 216.

Referring again to FIG. 1, FIG. 1 shows one example of a general purpose computing device in the form of a server 102A, 102B, 102C. In one embodiment of the invention, a computer such as the server 102A, 102B, 102C is suitable for use in the other figures illustrated and described herein. Server 102A, 102B, 102C has one or more processors or processing units and a system memory. In the illustrated embodiment, a system bus couples various system components including the system memory to the processors. The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The server 102A, 102B, 102C typically has at least some form of computer readable media. Computer readable media, which include both volatile and nonvolatile media, removable and non-removable media, may be any available medium that may be accessed by a computing device. By way of example and not limitation, computer readable media comprise computer storage media, such as database 106A, 106B and storage 108A, 108B, and communication media. In one embodiment, computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by server 102A, 102B, 102C. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. In the illustrated embodiment, system memory includes read only memory (ROM) and random access memory (RAM). A basic input/output system (BIOS), containing the basic routines that help to transfer information between elements within server 102A, 102B, 102C, such as during start-up, is typically stored in ROM. RAM typically contains data and/or program modules that are immediately accessible to and/or presently being operated on by processing unit. By way of example, and not limitation, FIG. 1 illustrates operating system 112, application programs 104, other program modules 110A, 110B, 110C, 114A, 114B, 114C, and program data.

The server 102A, 102B, 102C may also include other removable/non-removable, volatile/nonvolatile computer storage media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive, and magnetic disk drive and optical disk drive are typically connected to the system bus by a non-volatile memory interface, such as interface.

The drives or other mass storage devices and their associated computer storage media 108A, 108B discussed above and illustrated in FIG. 1, provide storage of computer readable instructions, data structures, program modules and other data for the server 102A, 102B, 102C.

A server 102A, 102B, 102CA may operate in a networked environment using logical connections to one or more remote computers, such as servers 102B, 102C. The servers 102B, 102C may be a personal computer, a server, a router, a network PC, a peer device or other common network node, and typically includes many or all of the elements described above relative to server 102A. The logical connection depicted in FIG. 1 includes a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of server 102A, 102B, 102C are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including server 102A, 102B, 102C, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, server 102A, 102B, 102C executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more hardware computer storage media having computer-executable components stored thereon that, when executed, transfer a file to a first node from a second node, said first and second nodes belonging to a cluster, said one or more computer storage media comprising:

a network file copy component of an operating system of the first node for copying a file from the second node to the first node, said network file copy component providing a plurality of file transfer paths between the first node and the second node, each of the file transfer paths comprising one or more nodes other than the first node and the second node;

a network node monitoring component of the operating system of the first node for determining a status for each of the one or more other nodes in the file transfer paths indicating the availability thereof, said status further comprising a designation of each of the one or more other nodes in the file transfer paths as private, public, or mixed as a function of a network thereof, said network monitoring component further comprising a tuned heartbeat mechanism provided by nodes in the cluster; and an application component associated with the first node for:
- monitoring, via the network monitoring component, the availability of the second node;
- selecting, as a function of the availability of the second node and the designation of each of the one or more other nodes as determined by the network monitoring component, one of the plurality of file transfer paths between the first node and the second node, wherein the application component is configured to avoid nodes designated as public;
- requesting, via the network file copy component, the transfer of the file from the second node to the first node via the selected file transfer path; and
- performing a recovery operation when the second node is no longer available on the network.

2. The one or more computer storage media of claim 1, wherein the application is a highly available application.

3. The one or more computer storage media of claim 1, wherein the application is an email application.

4. The one or more computer storage media of claim 1, wherein the file is a database transaction log.

5. The one or more computer storage media of claim 1, wherein the network file copy component is a one or more of the following file sharing services: Network File System (NFS), Server Message Block (SMB), HyperText Transfer Protocol (HTTP), Netware, Andrew file system (AFS), File Transfer Protocol (FTP) and Cells in Frames (CIF).

6. The one or more computer storage media of claim 1, wherein performing the recovery operation includes requesting the transfer of the file from an available node other than the second node.

7. A method of replicating a transaction log associated with a plurality of source computers to a destination computer in a networked environment, said source computers comprising nodes belonging to a cluster, said method comprising:
- providing a list of the plurality of source computers via a clustering service, said providing further comprising determining, via the clustering service, a state of the network and a state of each of the plurality of source computers;
- selecting a first source computer from the plurality of source computers to replicate the transaction log as a function of its state;
- requesting, by a network file copy service provided by an operating system of the destination computer, the first source computer to transmit the transaction log;
- monitoring, by a network monitoring service provided by the operating system of the destination computer, the first source computer to determine if the first source computer is inaccessible in the network, said monitoring further comprising utilizing a tuned heartbeat mechanism provided by nodes in the cluster;
- updating, via the clustering service, the state of the plurality of source computers;
- monitoring, if the first source computer is inaccessible, by the network monitoring service, the plurality of source computers other than the first source computer;
- selecting a second source computer from the plurality of source computers to replicate the transaction log as a function of its state; and
- requesting, by the network file copy service, the second source computer to transmit the transaction log before a timeout associated with receiving a response to said request from the first source computer and without terminating said request to the first source computer.

8. The method of claim 7, wherein the replicating is within an email application.

9. The method of claim 7, wherein the transaction log is a database transaction log.

10. The method of claim 7, wherein the network file copy service is a one or more of the following file sharing services: Network File System (NFS), Server Message Block (SMB), HyperText Transfer Protocol (HTTP), Netware, Andrew file system (AFS), File Transfer Protocol (FTP) and Cells in Frames (CIF).

11. The method of claim 7 further comprising:
- performing a recovery operation if the second source computer is inaccessible.

12. The method of claim 7, wherein the first and second computers belong to a cluster in the network.

13. The method of claim 9, wherein one or more hardware computer storage media have computer-executable instructions stored thereon for performing the method of claim 7.

14. In a computer network having a plurality of nodes connected by multiple network paths, a method of managing file transfers between the nodes, said nodes belonging to a cluster in the network, said method comprising:
- providing, by a network file copy component of an operating system, a list of one or more network paths having access to a file to be transferred from a source node to a destination node, each of said network paths comprising one or more nodes other than the source node and the destination node;
- verifying, by a network monitoring service provided by an operating system of the destination node, availability of at least one of the network paths for accessing the file, said availability being a function of a class designation associated with each of the network paths;
- selecting one of the available network paths for transferring the file from the source node to the destination node via the network file copy service, said selecting being a function of a priority designation associated with each of the available network paths;
- monitoring, by the network monitoring service, the selected network path to determine when the selected network path is no longer available, said monitoring comprising utilizing a tuned heartbeat mechanism provided by nodes in the cluster, said monitoring further comprising selecting another network path as a function of the priority designation associated with each of the available network paths when the selected network path is no longer available; and
- initiating a recovery procedure when all of the available network paths are no longer available.

* * * * *